US012640383B2

(12) United States Patent
Inoue et al.

(10) Patent No.: US 12,640,383 B2
(45) Date of Patent: May 26, 2026

(54) FUEL CELL SYSTEM

(71) Applicant: HONDA MOTOR CO., LTD., Tokyo (JP)

(72) Inventors: Tomoyuki Inoue, Wako (JP); Yuto Nakatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 18/124,639

(22) Filed: Mar. 22, 2023

(65) Prior Publication Data

US 2023/0317994 A1 Oct. 5, 2023

(30) Foreign Application Priority Data

Mar. 29, 2022 (JP) .............................. JP2022-052686

(51) Int. Cl.
| | |
|---|---|
| *H01M 8/04* | (2016.01) |
| *H01M 8/04089* | (2016.01) |
| *H01M 8/0438* | (2016.01) |
| *H01M 8/04746* | (2016.01) |
| *H01M 8/04992* | (2016.01) |

(52) U.S. Cl.
CPC ... H01M 8/04992 (2013.01); H01M 8/04089 (2013.01); H01M 8/04395 (2013.01); H01M 8/04753 (2013.01); H01M 8/04761 (2013.01)

(58) Field of Classification Search
CPC ......... H01M 8/04783; H01M 8/04753; H01M 8/04126
See application file for complete search history.

(56) References Cited

U.S. PATENT DOCUMENTS

| | | |
|---|---|---|
| 2009/0098426 A1 | 4/2009 | Tsuciya et al. |
| 2012/0202131 A1 | 8/2012 | Noto |
| 2015/0086894 A1 | 3/2015 | Ueda et al. |
| 2016/0254555 A1 | 9/2016 | Chikugo et al. |
| 2017/0346117 A1* | 11/2017 | Ojima .............. H01M 8/04228 |

FOREIGN PATENT DOCUMENTS

| | | |
|---|---|---|
| CN | 101416340 A | 4/2009 |
| CN | 102598381 A | 7/2012 |
| CN | 104247120 A | 12/2014 |
| JP | 2005-222854 A | 8/2005 |
| JP | 2006-164685 A | 6/2006 |
| JP | 2007-220625 A | 8/2007 |
| JP | 2020-126792 A | 8/2020 |

OTHER PUBLICATIONS

Office Action and Search Report dated Mar. 27, 2026 issued in the corresponding Chinese Patent Application No. 202310310897.7 with the English machine translation thereof.

* cited by examiner

*Primary Examiner* — Olatunji A Godo
(74) *Attorney, Agent, or Firm* — Carrier, Shende & Associates P.C.; Joseph P. Carrier; Jeffrey T. Gedeon

(57) ABSTRACT

The fuel cell system includes a control unit that calculates the flow rate of the oxygen-containing gas flowing through the supply passage based on the opening degree of the bypass valve, the opening degree of the stop valve, and the state of the oxygen-containing gas supply in the oxygen-containing gas supply unit, and determines that the measurement value of the flow rate measurement unit is not normal when the difference between the calculation value and the measurement value by the flow rate measurement unit is equal to or larger than a predetermined amount.

4 Claims, 5 Drawing Sheets

PRESSURE
RATIO

FLOW RATE

FUEL CELL SYSTEM

CROSS-REFERENCE TO RELATED APPLICATIONS

This application is based upon and claims the benefit of priority from Japanese Patent Application No. 2022-052686 filed on Mar. 29, 2022, the contents of which are incorporated herein by reference.

BACKGROUND OF THE INVENTION

Field of the Invention

The present invention relates to a fuel cell system capable of supplying electric power to a moving body, an industrial machine, or the like.

Description of the Related Art

In recent years, research and development have been conducted on fuel cells (fuel cell stacks) that contribute to energy efficiency in order to ensure that more people have access to affordable, reliable, sustainable and modern energy.

An oxygen-containing gas and a fuel gas are supplied to the fuel cell stack. The oxygen-containing gas is air pressurized by a compressor. The flow rate of the oxygen-containing gas is measured by a flow rate sensor (for example, a mass flow meter) provided upstream of the compressor.

JP 2020-126792 A discloses a method for determining an abnormality of a flow rate sensor. This method uses a pressure measurement value and a pressure calculation value to determine whether the flow rate sensor is abnormal. The pressure measurement value is detected by a pressure measuring device (pressure sensor) provided downstream of the compressor.

SUMMARY OF THE INVENTION

In the low rotation range of the compressor, the rate of change in the pressure ratio with respect to the change in the amount discharged from the compressor is small. Therefore, the pressure measurement value used in the method of JP 2020-126792 A causes a large error particularly when the compressor rotates in a low rotation range. Therefore, there is a demand for a technique for determining abnormality of a flow rate sensor without using a pressure measurement value, that is, without using a pressure sensor.

An object of the present invention is to solve the aforementioned problem.

According to an aspect of the present invention, there is provided a fuel cell system including: a fuel cell stack configured to generate electric power using an oxygen-containing gas and a fuel gas; a supply passage through which the oxygen-containing gas to be supplied to the fuel cell stack flows; a discharge passage through which the oxygen-containing off-gas discharged from the fuel cell stack flows; a bypass channel connecting the supply passage and the discharge passage; an oxygen-containing gas supply unit provided in the supply passage and configured to supply the oxygen-containing gas to the fuel cell stack; a flow rate measurement unit configured to measure a flow rate of the oxygen-containing gas flowing through the supply passage; a bypass valve provided in the bypass channel, an opening degree of the bypass valve being adjustable; a stop valve provided in the discharge passage, an opening degree of the stop valve being adjustable; and a control unit configured to acquire a calculation value of a flow rate of the oxygen-containing gas flowing through the supply passage based on the opening degree of the bypass valve, the opening degree of the stop valve and a state of oxygen-containing gas supply in the oxygen-containing gas supply unit, and determine a measurement value by the flow rate measurement unit to be anomalous in a case where a difference between the calculation value and the measurement value is equal to or greater than a predetermined value.

According to the present invention, because the flow rate of the oxygen-containing gas can be calculated without using a pressure measurement value, that is, a pressure sensor, it is possible to accurately determine whether or not the flow rate measurement unit is normal.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

1. Configuration of Fuel Cell System 10

Figure 1:
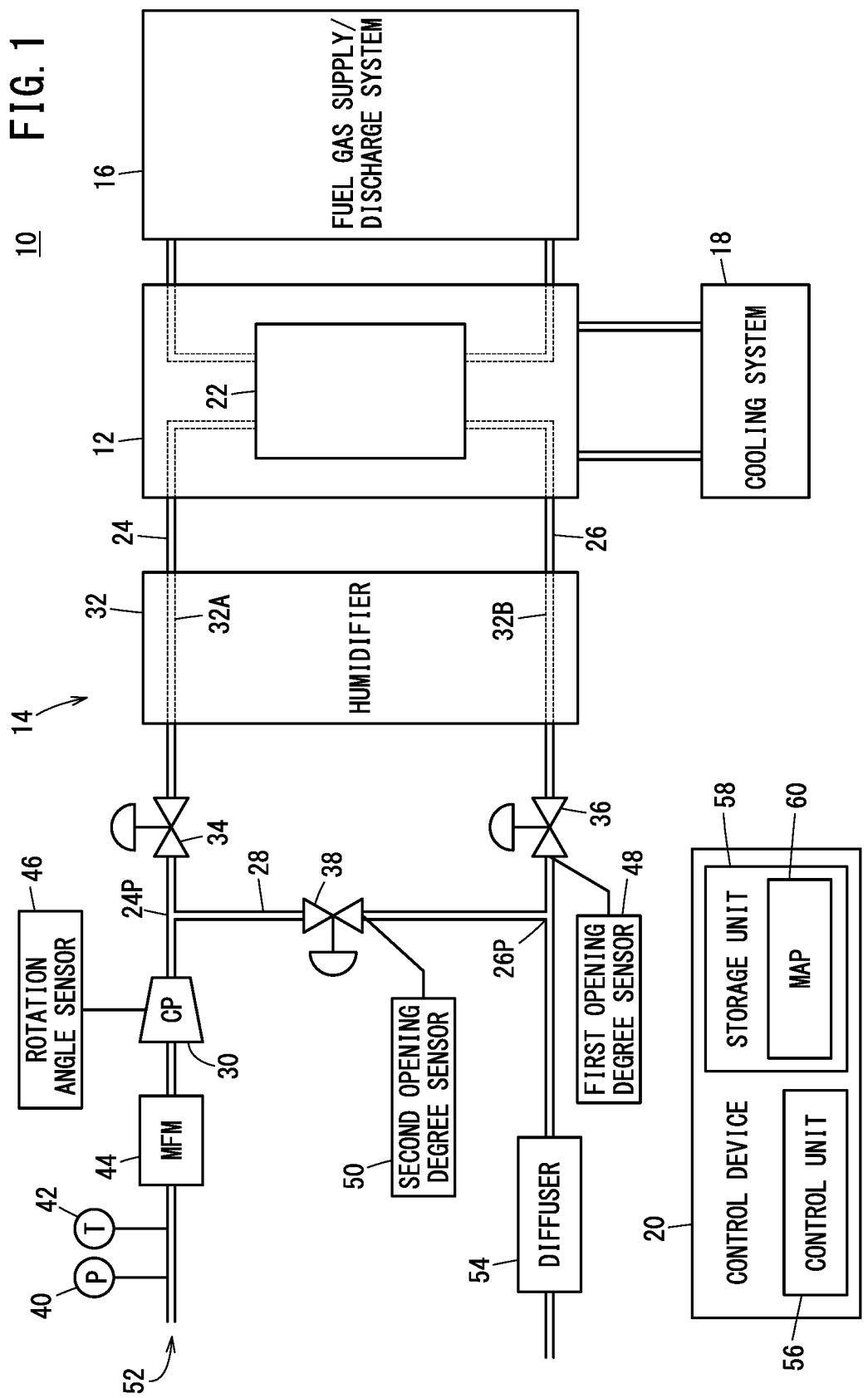
FIG. 1 is a schematic diagram of a fuel cell system according to an embodiment.

FIG. 1 is a schematic diagram illustrating a fuel cell system 10 according to the present invention. The fuel cell system 10 can be used in, for example, moving objects (automobiles, ships, aircrafts, and the like), industrial machines, and the like. Thus, the fuel cell system 10 contributes to energy efficiency.

The fuel cell system 10 includes a fuel cell stack 12, an oxygen-containing gas supply/discharge system 14, a fuel gas supply/discharge system 16, a cooling system 18, and a control device 20. The output (generated power) of the fuel cell stack 12 may be supplied to one or more loads. The output (generated power) of the fuel cell stack 12 may be supplied to a power storage device.

The fuel cell stack 12 includes a plurality of power generation cells 22. Each of the power generation cells 22 includes a solid polymer electrolyte membrane, an anode, and a cathode. In the power generation cell 22, a cathode flow field for supplying an oxygen-containing gas to the cathode is formed. In the power generation cell 22, an anode flow field for supplying a fuel gas to the anode is formed. The fuel cell stack 12 generates electric power by reactions between the oxygen-containing gas (air) and the fuel gas (hydrogen).

The oxygen-containing gas supply/discharge system 14 includes components for supplying the oxygen-containing gas to the cathode flow field of the fuel cell stack 12 and components for discharging the oxygen-containing off-gas from the cathode flow field of the fuel cell stack 12. The oxygen-containing gas supply/discharge system 14 includes, as various flow paths, a supply passage 24, a discharge passage 26, and a bypass channel 28. The oxygen-containing gas supply/discharge system 14 includes, as various devices, a compressor (oxygen-containing gas supply unit) 30, a humidifier 32, a first stop valve 34, a second stop valve 36, and a bypass valve 38. The oxygen-containing gas supply/ discharge system 14 includes, as various sensors, a pressure sensor 40, a temperature sensor 42, a mass flow meter (flow rate measuring unit) 44, a first opening degree sensor 48, and a second opening degree sensor 50.

The supply passage 24 connects an intake 52 of the oxygen-containing gas to an inlet of the cathode flow field of the fuel cell stack 12. In the supply passage 24, the pressure sensor 40, the temperature sensor 42, the mass flow meter 44, the compressor 30, the first stop valve 34, and the humidifier flow path 32A of the humidifier 32 are provided in this order from the upstream (the intake 52) side to the downstream (the fuel cell stack 12) side. In the supply passage 24 between the compressor 30 and the first stop valve 34, there is a branching portion 24P connected to the bypass channel 28.

The discharge passage 26 connects an outlet of the cathode flow field of the fuel cell stack 12 and a diluter 54. In the discharge passage 26, the humidifier flow path 32B of the humidifier 32 and the second stop valve 36 are provided in this order from the upstream (the fuel cell stack 12) side toward the downstream (the diluter 54) side. In the discharge passage 26, there is a merging portion 26P connected to the bypass channel 28 downstream of the second stop valve 36.

The bypass channel 28 connects the supply passage 24 and the discharge passage 26. The bypass channel 28 connects the branching portion 24P of the supply passage 24 and the merging portion 26P of the discharge passage 26. The bypass channel 28 is provided with the bypass valve 38.

The pressure sensor 40 detects the pressure of the oxygen-containing gas introduced through the intake 52, i.e., the atmospheric pressure. The temperature sensor 42 detects the temperature of the oxygen-containing gas introduced through the intake 52, that is, the intake air temperature. The mass flow meter 44 measures the flow rate of the oxygen-containing gas introduced through the intake 52, i.e., the flow rate of the oxygen-containing gas to be taken into the compressor 30. The detection value of the pressure sensor 40, the detection value of the temperature sensor 42, and the measurement value of the mass flow meter 44 are transmitted to the control device 20.

The compressor 30 is constituted by a mechanical supercharger or the like driven by a motor. The compressor 30 pressurizes the oxygen-containing gas introduced through the intake 52, and supplies the oxygen-containing gas to the fuel cell stack 12 through the humidifier 32. The operation of the compressor 30 is controlled by the control device 20. The compressor 30 is provided with a rotation angle sensor 46 that detects the rotation angle of the motor. The rotation angle sensor 46 is, for example, a resolver, a rotary encoder, or the like.

The humidifier 32 has a humidifier flow path 32A and a humidifier flow path 32B. The oxygen-containing gas heated to a high temperature and dried is discharged from the compressor 30 and flows into the humidifier flow path 32A of the humidifier 32. The highly-humidified oxygen-containing off-gas discharged from the fuel cell stack 12 flows into the humidifier flow path 32B of the humidifier 32. In the humidifier 32, the dried oxygen-containing gas is humidified by the high-humidity oxygen-containing off-gas.

The first stop valve 34 can adjust the opening degree of the supply passage 24 between the branching portion 24P and the humidifier 32. The first stop valve 34 is a back pressure valve. The second stop valve 36 can adjust the opening degree of the discharge passage 26 between the humidifier 32 and the merging portion 26P. The second stop valve 36 is a back pressure valve. The bypass valve 38 can adjust the opening degree of the bypass channel 28. The opening/closing operation and the opening degree of each of the first stop valve 34, the second stop valve 36, and the bypass valve 38 are controlled by the control device 20.

The first opening degree sensor 48 detects the opening degree of the second stop valve 36. The second opening degree sensor 50 detects the opening degree of the bypass valve 38. The detection value of the first opening degree sensor 48 and the detection value of the second opening degree sensor 50 are transmitted to the control device 20.

The fuel gas supply/discharge system 16 includes components for supplying the fuel gas to the anode flow field of the fuel cell stack 12 and components for discharging the fuel off-gas from the anode flow field of the fuel cell stack 12.

The cooling system 18 includes components for supplying a coolant to the fuel cell stack 12, and components for discharging the coolant from the fuel cell stack 12.

The control device 20 includes a control unit 56 and a storage unit 58. The control unit 56 includes a processing circuit. The processing circuit may be a processor such as a CPU or the like. The processing circuit may be an integrated circuit such as an ASIC, an FPGA, or the like. The processor is capable of executing various processes by executing programs stored in the storage unit 58. At least a portion from among a plurality of processes may be performed by an electronic circuit including a discrete device.

The control unit 56 controls the operation of the fuel cell system 10. For example, the control unit 56 receives signals transmitted from various sensors. The control unit 56 controls the oxygen-containing gas supply/discharge system 14, the fuel gas supply/discharge system 16, and the cooling system 18 based on the received signals. For example, the control unit 56 transmits signals indicating operation command values to the valves, the compressor 30, and the like. In addition, the control unit 56 performs a state determination processing described later to determine whether or not the measurement value of the mass flow meter 44 is normal.

The storage unit 58 includes a volatile memory and a non-volatile memory. Examples of the volatile memory include a RAM (Random Access Memory) or the like. The volatile memory is used as a working memory of the processor. In the volatile memory, data and the like required for carrying out processing or computations are temporarily stored therein. Examples of the non-volatile memory include a ROM (Read Only Memory), a flash memory, and the like. Such a non-volatile memory is used as a storage memory. Programs, tables, and maps 60, and the like are stored in the non-volatile memory. At least part of the storage unit 58 may be provided in the processor, the integrated circuit, etc. as described above.

2. Principle of the Invention

Figure 2:
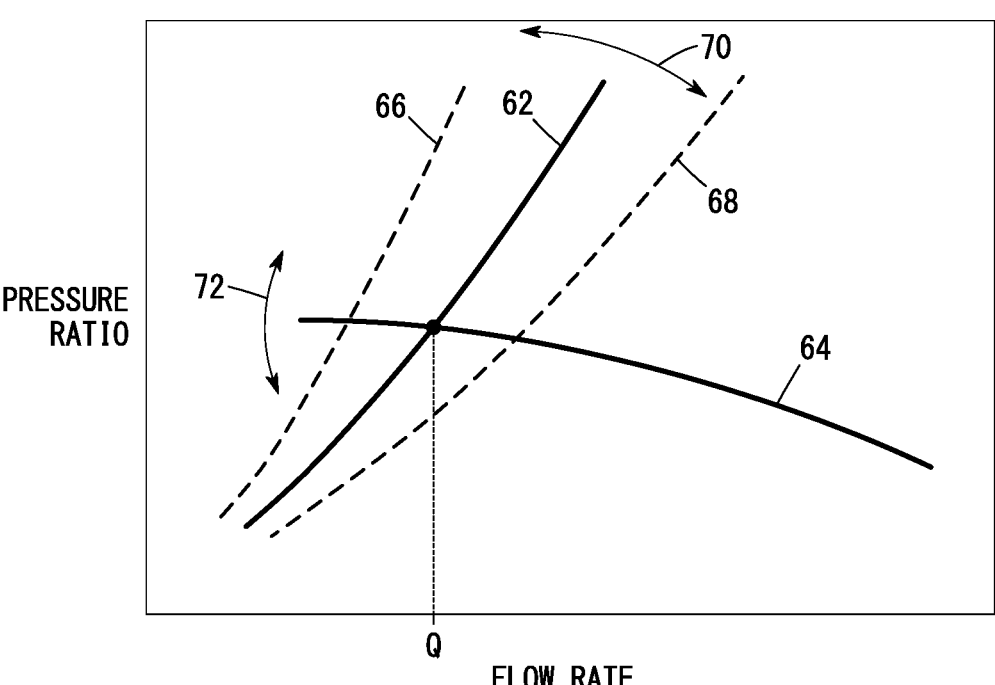
FIG. 2 is a P-Q characteristics chart in a case of a small opening degree of a bypass valve.
Figure 3:
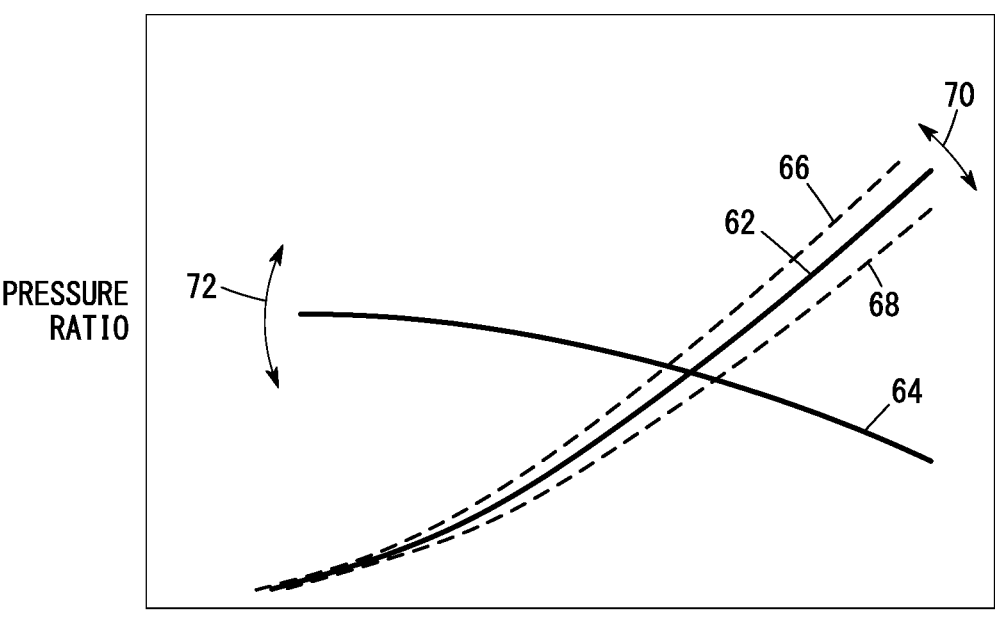
FIG. 3 is a P-Q characteristics chart in a case of a large opening degree of a bypass valve.

FIG. 2 is a P-Q characteristics chart in a case of a small opening degree of the bypass valve 38. FIG. 3 is a P-Q characteristics chart in a case of a large opening degree of the bypass valve 38. The P-Q characteristics shown in FIGS. 2 and 3 relate to the pressure ratio and the flow rate of the oxygen-containing gas. The control unit 56 compares the measurement value of the mass flow meter 44 with the theoretical calculation value, and determines whether or not the measurement value of the mass flow meter 44 is normal. The control unit 56 calculates the theoretical calculation value using the P-Q characteristics of the fuel cell system 10 and the P-Q characteristics of the compressor 30. Hereinafter, for convenience of description, the P-Q characteristics of the fuel cell system 10 is also referred to as a "system PQ" (system characteristics). The P-Q characteristics of the compressor 30 are also referred to as "compressor PQ". In FIGS. 2 and 3, characteristics 62 are the system PQ and characteristics 64 are the compressor PQ.

The system PQ, that is, the characteristics 62 indicate the relationship between the pressure increase ratio (pressure decrease ratio) of the oxygen-containing gas in the oxygen-containing gas supply/discharge system 14 and the flow rate of the oxygen-containing gas in the oxygen-containing gas supply/discharge system 14. The pressure increase ratio (pressure decrease ratio) of the oxygen-containing gas supply/discharge system 14 is the ratio between the gas pressure at the outlet of the compressor 30 and the gas pressure at the inlet of the diluter 54. On the other hand, the compressor PQ, that is, characteristics 64 indicate the relationship between the pressure ratio of the oxygen-containing gas in the compressor 30 and the flow rate of the oxygen-containing gas in the compressor 30. The flow rate (Q) at the intersection of the characteristics 62 and the characteristics 64 corresponds to a theoretical calculation value of the flow rate.

If the pressure loss at the oxygen-containing gas supply/discharge system 14 is constant, the system PQ is uniquely determined. However, in practice, the pressure loss at the oxygen-containing gas supply/discharge system 14 is not constant. Therefore, the system PQ changes in accordance with variation in the pressure loss at the oxygen-containing gas supply/discharge system 14.

For example, the pressure loss at the oxygen-containing gas supply/discharge system 14 varies in accordance with a change in the opening degree of the second stop valve 36. The larger the opening degree of the second stop valve 36 is, the smaller the pressure loss at the second stop valve 36 is. The smaller the opening degree of the second stop valve 36 is, the larger the pressure loss at the second stop valve 36 is. Therefore, as indicated by arrows 70 in FIGS. 2 and 3, the characteristics 62 as the system PQ shift between the characteristics 66 and the characteristics 68. The characteristics 66 are the system PQ in the case where the second stop valve 36 is opened at the lower limit opening degree (opening degree minimum). Characteristics 68 are the system PQ in the case where the second stop valve 36 is opened at the upper limit opening degree (maximum opening degree).

The pressure loss at the oxygen-containing gas supply/discharge system 14 varies in accordance with a change in the opening degree of the bypass valve 38. The larger the opening degree of the bypass valve 38 is, the smaller the pressure loss at the bypass valve 38 is. The smaller the opening degree of the bypass valve 38 is, the larger the pressure loss at the bypass valve 38 is. Therefore, for example, as can be seen as the difference between FIG. 2 and FIG. 3, the characteristics 62, the characteristics 66, and the characteristics 68 are shifted with a change in the opening degree of the bypass valve 38.

As the opening degree of the bypass valve 38 becomes smaller, the ratio of the oxygen-containing gas flowing through the fuel cell stack 12 and the second stop valve 36 to the oxygen-containing gas flowing through the bypass channel 28 becomes larger. Therefore, the smaller the opening degree of the bypass valve 38, the greater the influence of the opening degree of the second stop valve 36 on the pressure loss at the oxygen-containing gas supply/discharge system 14. From another point of view, the pressure loss is not dominantly determined by the route through the bypass valve 38. Therefore, as can be seen as a difference between FIGS. 2 and 3, as the opening degree of the bypass valve 38 becomes smaller, the system PQ largely shifts depending on the change in the opening degree of the second stop valve 36. In other words, as the opening degree of the bypass valve 38 becomes smaller, the difference between the upper limit value and the lower limit value, i.e., the range between the characteristics 66 and the characteristics 68 increases.

On the other hand, as the opening degree of the bypass valve 38 becomes larger, the ratio of the oxygen-containing gas flowing through the fuel cell stack 12 and the second stop valve 36 to the oxygen-containing gas flowing through the bypass channel 28 becomes smaller. Therefore, the larger the opening degree of the bypass valve 38, the smaller the influence of the opening degree of the second stop valve 36 on the pressure loss at the oxygen-containing gas supply/discharge system 14. From another point of view, the pressure loss is dominantly determined by the route passing through the bypass valve 38. Therefore, as can be seen as a difference between FIGS. 2 and 3, as the opening degree of the bypass valve 38 becomes larger, the system PQ shifts more slightly depending on the change in the opening degree of the second stop valve 36. In other words, as the opening degree of the bypass valve 38 becomes larger, the difference between the upper limit value and the lower limit value, that is, the range between the characteristics 66 and the characteristics 68 decreases.

Further, as can be seen as a difference between FIGS. 2 and 3, the smaller the opening degree of the bypass valve 38 is, the larger the pressure ratio and the rate of change in the pressure ratio of the system PQ are. Further, as shown in each of FIGS. 2 and 3, the smaller the opening degree of the second stop valve 36 is, the larger the pressure ratio and the rate of change in the pressure ratio of the system PQ are.

If the rotational speed of the compressor 30 (the rotational speed of the motor) is constant, the compressor PQ is uniquely determined. However, in practice, the rotational speed of the compressor 30 is not constant. For example, the rotational speed of the compressor 30 changes according to a command value from the control unit 56. Therefore, as indicated by an arrow 72 in FIGS. 2 and 3, the characteristics 64 of the compressor PQ change with a change in the rotational speed of the compressor 30. The higher the rotational speed of the compressor 30, the higher the pressure ratio.

As described above, by using the system PQ, the compressor PQ, the opening degree of the second stop valve 36, the opening degree of the bypass valve 38, and the rotational speed of the compressor 30, it is possible to calculate the above-described theoretical calculation value. However, the detection value of the opening degree of the second stop valve 36 and the detection value of the opening degree of the bypass valve 38 are susceptible to error. Examples of the error include an error in an actual opening degree with respect to a command value, an error in a sensor, and an error in calculation. Therefore, in acquiring the calculation value, it is preferable to set a tolerance to the calculation value. This tolerance also increases as the opening degree of the bypass valve 38 decreases, and decreases as the opening degree of the bypass valve 38 increases.

In the present embodiment, the storage unit 58 stores a plurality of maps 60 (FIG. 1) indicating the system PQ and the compressor PQ. The map 60 is created for each of a plurality of ranges of the opening degree of the bypass valve 38. In each map 60, the system PQ is determined by the opening degree of the second stop valve 36, and the compressor PQ is determined by the rotational speed of the compressor 30. While the system PQ is different between the maps 60, the compressor PQ is the same. The control unit 56 acquires the theoretical calculation value of the flow rate using the map 60 corresponding to the opening degree of the bypass valve 38 among the plurality of maps 60.

3. State Determination Processing

Figure 4:
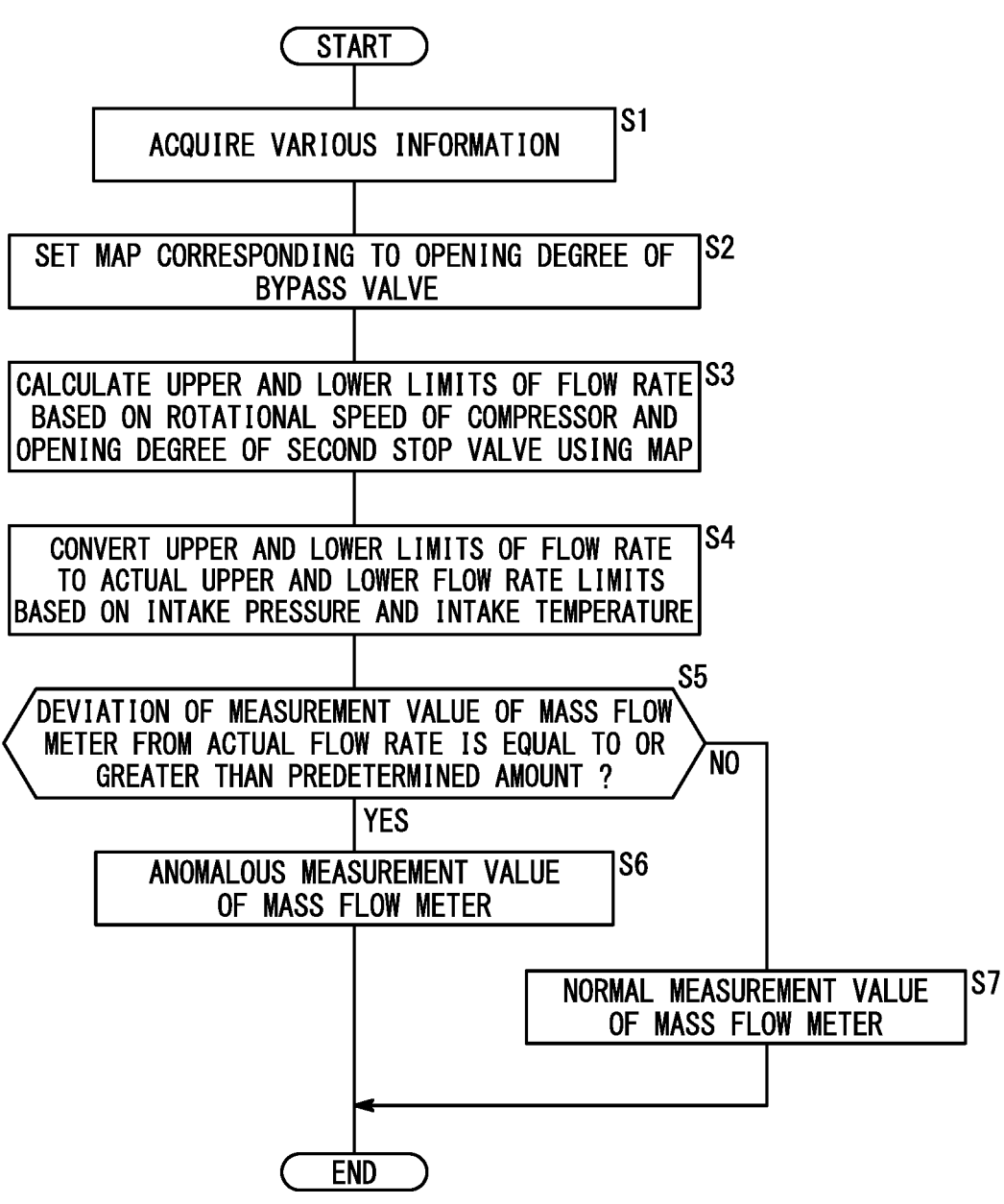
FIG. 4 is a flowchart showing a procedure of a state determination processing for a mass flow meter.

FIG. 4 is a flowchart showing a procedure of a state determination processing of a mass flow meter 44. The control unit 56 executes the state determination processing at an arbitrary timing. For example, the control unit 56 may execute the state determination processing when the fuel cell system 10 is activated. In addition, the control unit 56 may execute the state determination processing every predetermined time.

In step S1, the control unit 56 acquires various information to be used in the processing after step S2. The control unit 56 acquires a detection value of the opening degree of the second stop valve 36 from the first opening degree sensor 48. The control unit 56 acquires a detection value of the opening degree of the bypass valve 38 from the second opening degree sensor 50. The control unit 56 acquires a detection value of the rotational speed of the compressor 30 from the rotation angle sensor 46. The control unit 56 may transmit command values to the respective devices as the opening degrees and the rotational speed. The control unit 56 acquires a detection value of the intake pressure from the pressure sensor 40. The control unit 56 acquires a detection value of the intake temperature from the temperature sensor 42. The control unit 56 acquires a measurement value of the flow rate from the mass flow meter 44. When the process of step S1 is completed, the process transitions to step S2.

In step S2, the control unit 56 selects a map 60 corresponding to the opening degree of the bypass valve 38 from among the plurality of maps 60 stored in the storage unit 58. The control unit 56 sets the selected map 60 as the P-Q characteristics to be used in step S3. When the process of step S2 is completed, the process transitions to step S3.

Figure 5:
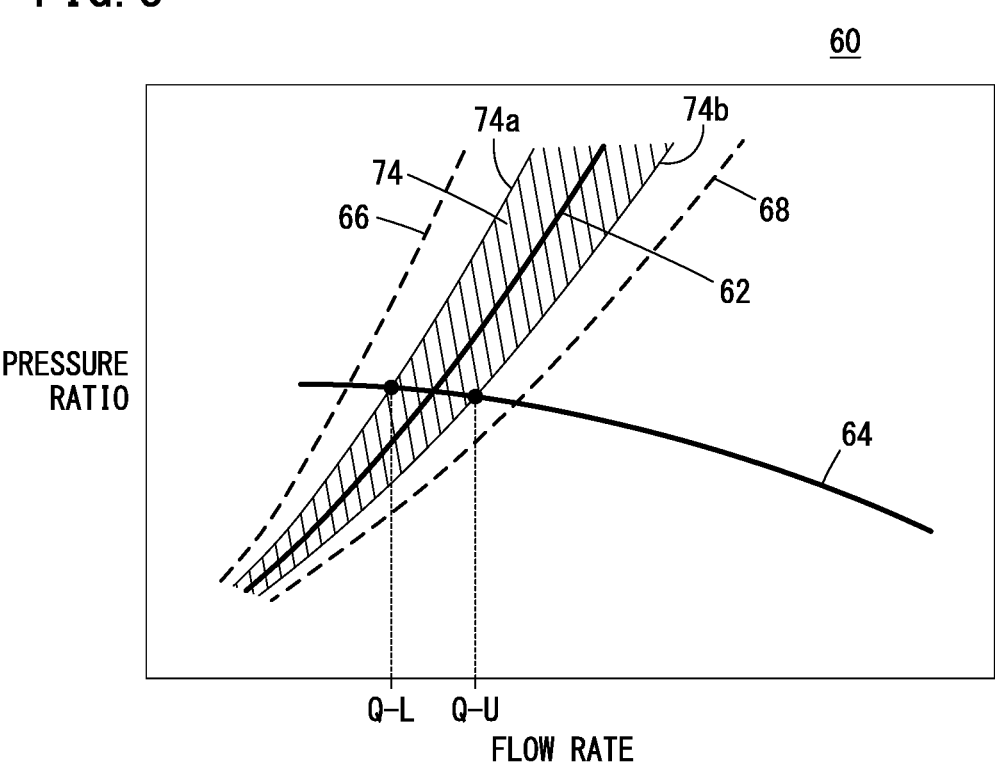
FIG. 5 is a P-Q characteristics chart used in calculation of a flow rate range.

In step S3, the control unit 56 uses the map 60 set in step S2 to calculate the upper limit Q-U and the lower limit Q-L of the flow rate corresponding to the rotational speed of the compressor 30 and the opening degree of the second stop valve 36, that is, the range of the flow rate. The processing performed by the control unit 56 in step S3 will be described with reference to FIG. 5. The control unit 56 specifies the characteristics 62 (system PQ) corresponding to the detection value of the first opening degree sensor 48 (the opening degree of the second stop valve 36) using the map 60. The characteristics 62 are positioned between the characteristics 66 and the characteristics 68. There is a possibility that the detection value of the first opening degree sensor 48 is susceptible to error. The control unit 56 calculates a range 74 obtained by adding a tolerance to the characteristics 62. How to determine the error and the tolerance is predetermined. The control unit 56 specifies characteristics 64 (compressor PQ) corresponding to the rotational speed of the compressor 30 by using the map 60. The control unit 56 sets the flow rate value at the intersection of the boundary 74a on the low flow rate side of the range 74 and the characteristics 64, as the lower limit Q-L of the flow rate. Further, the control unit 56 sets the flow rate value at the intersection of the boundary 74b on the high flow rate side of the range 74 and the characteristics 64, as the upper limit Q-U of the flow rate. When the process of step S3 is completed, the process transitions to step S4.

In step S4, the control unit 56 converts the upper and lower limits (Q-U and Q-L) of the flow rate calculated in step S3 into upper and lower limits (Q'-U and Q'-L) of the actual flow rate (calculation value), on the basis of the intake pressure and the intake temperature. The conversion formula is stored in the storage unit 58. When the process of step S4 is completed, the process transitions to step S5.

In step S5, the control unit 56 determines whether or not deviation of the measurement value of the mass flow meter 44 from the actual flow rate (calculation value) acquired in step S4 is equal to or greater than a predetermined amount. For example, when the measurement value falls outside the range of the actual flow rate, that is, when the measurement value is lower than the lower limit Q'-L of the actual flow rate or higher than the upper limit Q'-U of the actual flow rate, the control unit 56 determines that the deviation is equal to or greater than the predetermined amount. Alternatively, the control unit 56 may calculate an average value of the upper and lower limits (Q'-U and Q'-L) of the actual flow rates, and determine that the deviation is equal to or greater than the predetermined value when a difference between the measurement value and the average value is equal to or greater than a predetermined value. In the case that the deviation is equal to or greater than the predetermined amount (step S5: YES), the process proceeds to step S6. On the other hand, when the deviation is not equal to or greater than the predetermined amount (step S5: NO), the processing proceeds to step S7.

When the process proceeds from step S5 to step S6, the control unit 56 determines that the measurement value of the mass flow meter 44 is abnormal. In this case, there is a possibility that the mass flow meter 44 has failed to operate properly. The control unit 56 may output, for example, a command signal for warning display to a display device (not shown). Alternatively, the control unit 56 may output a signal for notifying another control device (not shown) of the failure. After execution of step S6, the state determination processing is brought to an end.

When the process proceeds from step S5 to step S7, the control unit 56 determines that the measurement value of the mass flow meter 44 is normal. After execution of step S7, the state determination processing is brought to an end.

4. Invention Obtained from Embodiment

The invention understood from the above embodiment will be described below.

The fuel cell system (10) according to the embodiment of the present invention including: the fuel cell stack (12) configured to generate electric power using the oxygen-containing gas and the fuel gas; the supply passage (24) through which the oxygen-containing gas to be supplied to the fuel cell stack flows; the discharge passage (26) through which the oxygen-containing off-gas discharged from the fuel cell stack flows; the bypass channel (28) connecting the supply passage and the discharge passage; the oxygen-containing gas supply unit (30) provided in the supply passage and configured to supply the oxygen-containing gas to the fuel cell stack; the flow rate measurement unit (44) configured to measure the flow rate of the oxygen-containing gas flowing through the supply passage; the bypass valve (38) provided in the bypass channel, the opening degree of the bypass valve being adjustable; the stop valve (36) provided in the discharge passage, with the opening degree of the stop valve being adjustable, and the control unit (56) configured to acquire a calculation value of a flow rate of the oxygen-containing gas flowing through the supply passage based on the opening degree of the bypass valve, the opening degree of the stop valve and an state of oxygen-containing gas supply in the oxygen-containing gas supply unit, and determine the measurement value by the flow rate measurement unit to be anomalous in the case where the difference between the calculation value and the measurement value by the flow rate measurement unit is equal to or greater than the predetermined value.

In the above configuration, an appropriate flow rate of the oxygen-containing gas is calculated on the basis of the opening degree of the bypass valve and the opening degree of the stop valve. According to the present embodiment, because the flow rate of the oxygen-containing gas can be calculated without using a pressure sensor, it is possible to accurately determine whether or not the flow rate measurement unit is normally functioning.

In the embodiment of the present invention, the control unit may set pressure-flow rate characteristics (62, 66, 68) of the fuel cell system in a manner that a range of the pressure-flow rate characteristics between the upper and lower limit opening degrees of the stop valve becomes smaller as the opening degree of the bypass valve becomes larger, and calculate the flow rate of the oxygen-containing gas flowing through the supply passage within the range between the upper and lower limit opening degrees of the stop valve.

Regarding the pressure loss in the fuel cell system, as the bypass valve opens wider, the pressure loss in the route passing through the bypass valve becomes more dominant than the pressure loss in the route passing through the stop valve. For this reason, it is possible to reduce the influence on the flow rate due to error in the opening degree of the stop valve (such as the difference between the command value and the actual opening degree). As a result, the accuracy of the calculation value can be increased.

In the embodiment of the present invention, the control unit may acquire an upper limit value (Q'-U) and a lower limit value (Q'-L) of the calculation value based on pressure-flow rate characteristics (64) of the oxygen-containing gas supply unit set depending on the state of the oxygen-containing gas supply in the oxygen-containing gas supply unit and pressure-flow rate characteristics of the fuel cell system, and determine that the measurement value by the flow rate measurement unit is anomalous when the measurement value of the flow rate measurement unit falls outside the range between the upper limit and the lower limit.

According to the above configuration, it is possible to accurately calculate the flow rate characteristics of the fuel cell system.

In an aspect of the present invention, the control unit may set the pressure-flow rate characteristics of the fuel cell system based on the opening degree of the bypass valve and the opening degree of the stop valve, set the pressure-flow rate characteristics of the oxygen-containing gas supply unit based on the state of the oxygen-containing gas supply in the oxygen-containing gas supply unit, and obtain the calculation value using the pressure-flow rate characteristics of the fuel cell system and the pressure-flow rate characteristics of the oxygen-containing gas supply unit.

The present invention is not limited to the above disclosure, and various modifications are possible without departing from the essence and gist of the present invention.

The invention claimed is:

1. A fuel cell system comprising:
a fuel cell stack configured to generate electric power using an oxygen-containing gas and a fuel gas;
a supply passage through which the oxygen-containing gas to be supplied to the fuel cell stack flows;

a discharge passage through which the oxygen-containing off-gas discharged from the fuel cell stack flows;
a bypass channel connecting the supply passage and the discharge passage;
an oxygen-containing gas supply unit provided in the supply passage and configured to supply the oxygen-containing gas to the fuel cell stack;
a flow rate measurement unit disposed in the supply passage and configured to measure a flow rate of the oxygen-containing gas flowing through the supply passage; and
a bypass valve provided in the bypass channel, an opening degree of the bypass valve being adjustable;
a stop valve provided in the discharge passage, an opening degree of the stop valve being adjustable; and
one or more processors that execute computer-executable instructions stored in a memory, wherein the one or more processors are configured by the computer-executable instructions to:
acquire a calculation value of a flow rate of the oxygen containing gas flowing through the supply passage based on the opening degree of the bypass valve, the opening degree of the stop valve and a state of oxygen-containing gas supply in the oxygen-containing gas supply unit, and determine a measurement value by the flow rate measurement unit to be anomalous in a case where a difference between the calculation value and the measurement value by the flow rate measurement unit is equal to or greater than a predetermined value.

2. The fuel cell system according to claim 1, wherein the one or more processors cause the fuel cell system to:
set a pressure-flow rate characteristic of the fuel cell system in a manner that a range of the pressure-flow rate characteristics between upper and lower limit opening degrees of the stop valve becomes smaller as the opening degree of the bypass valve becomes larger, and
calculate the flow rate of the oxygen-containing gas flowing through the supply passage within the range between the upper and lower limit the opening degrees of the stop valve.

3. The fuel cell system according to claim 2, wherein the one or more processors cause the fuel cell system to:
obtain an upper limit value and a lower limit value of the calculation value based on a pressure-flow rate characteristic of the oxygen-containing gas supply unit set depending on the state of the oxygen-containing gas supply in the oxygen-containing gas supply unit and the pressure-flow rate characteristic of the fuel cell system, and
determine that the measurement value by the flow rate measurement unit is anomalous when the measurement value by the flow rate measurement unit falls outside a range between the upper limit and the lower limit.

4. The fuel cell system according to claim 1, the one or more processors cause the fuel cell system to:
set a pressure-flow rate characteristic of the fuel cell system depending on the opening degree of the bypass valve and the opening degree of the stop valve,
set a pressure-flow rate characteristic of the oxygen-containing gas supply unit depending on the state of the oxygen-containing gas supply in the oxygen-containing gas supply unit, and obtain the calculation value using the pressure-flow rate characteristic of the fuel cell system and the pressure-flow rate characteristic of the oxygen-containing gas supply unit.

* * * * *